(12) United States Patent
Schabuble et al.

(10) Patent No.: US 6,346,806 B1
(45) Date of Patent: Feb. 12, 2002

(54) DEVICE FOR DETECTING THE POSITION OF A MOVEABLE MAGNET TO PRODUCE A MAGNETIC FIELD

(75) Inventors: Caroline Schabuble, Mannheim; Roland Seefried, Heidelberg; Thomas Schneider, Kirchheim, all of (DE)

(73) Assignee: Pepperl +Fuchs GmbH, Mannheim (DE)

( * ) Notice: Subject to any disclaimer, the term of this patent is extended or adjusted under 35 U.S.C. 154(b) by 0 days.

(21) Appl. No.: 09/381,186

(22) PCT Filed: Mar. 12, 1998

(86) PCT No.: PCT/EP98/01410

§ 371 Date: Sep. 13, 1999

§ 102(e) Date: Sep. 13, 1999

(87) PCT Pub. No.: WO98/40699

PCT Pub. Date: Sep. 17, 1998

(30) Foreign Application Priority Data

Mar. 12, 1997 (DE) .......................... 197 101 36
Mar. 21, 1997 (DE) .......................... 197 117 81
Mar. 7, 1998 (WO) .............. PCT/EP98/01339

(51) Int. Cl.$^7$ .............................. G01B 7/14
(52) U.S. Cl. .................. 324/207.14; 324/207.24; 324/207.2
(58) Field of Search ............. 324/207.14, 207.24, 324/207.13, 207.22, 235, 207.2; 92/5 R; 73/779, 862.69

(56) References Cited

U.S. PATENT DOCUMENTS 4,273,028 A * 6/1981 Turnwald et al. ............. 91/275
5,195,377 A * 3/1993 Garshelis ...................... 73/779
5,231,352 A * 7/1993 Huber .................... 324/207.24
6,119,579 A * 9/2000 Pawelski ..................... 92/5 R

FOREIGN PATENT DOCUMENTS

DE 3738151 5/1988
EP 0457762 11/1991

* cited by examiner

Primary Examiner—Glenn W. Brown
Assistant Examiner—Subhash Zaveri
(74) Attorney, Agent, or Firm—Horst M. Kasper

(57) ABSTRACT

The invention relates to a device for detecting the position of a magnet which is positioned so that it is moveable (3, 23, 24) to produce a magnetic field (6) through a ferromagnetic wall (1, 29), a magnetic field sensor (10, 21, 21') being situated in front of said wall. When said magnet (3, 23, 24) is moved in relation to said wall (1), the lines (6) of the field build up a useful flux (6) which progresses in said wall (1, 29). Said useful flux has magnetic remanence (7) which is retained after the magnet (3, 23, 24) has passed by, is aligned along the movement axis of the magnet (3, 23, 24) in accordance with the polarity, and builds up a fringing flux (12) to the front side of the wall (1, 29) where the magnetic field sensor (10, 21, 21') is positioned. Outside of said wall, the fringing flux (12) is opposed and is aligned with the useful flux (6). The magnetic field sensor is a magnetic field sensor element (10, 21, 21') located at a short distance from the wall (1, 29) and detects the field direction of the fringing flux (12); when the magnet (3, 23, 24) passes by, the fringing flux is superposed by the field (6) of the magnet (3, 23, 24). The magnetic field sensor (10, 21, 21') registers the change of field, which is then used to produce a switching signal.

23 Claims, 3 Drawing Sheets

Figure 1:
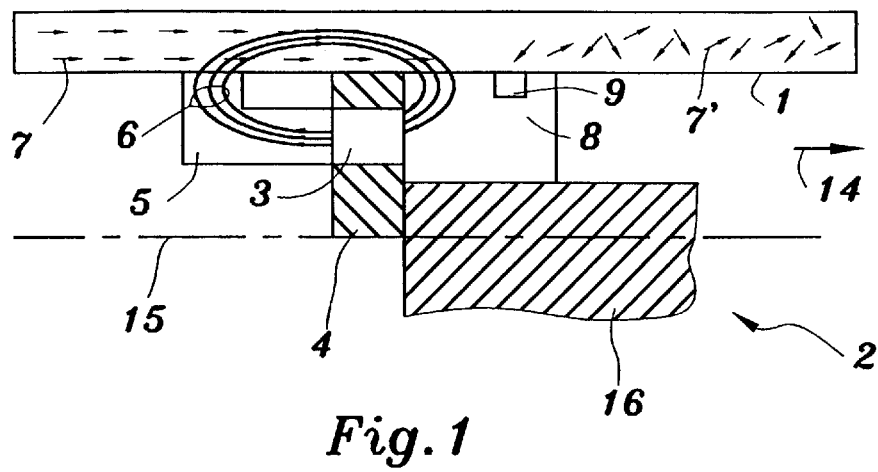

DEVICE FOR DETECTING THE POSITION OF A MOVEABLE MAGNET TO PRODUCE A MAGNETIC FIELD

TECHNICAL AREA

The invention relates to a device for detecting the position of a moveably arranged magnet for generating a magnetic field through a wall made of ferromagnetic material, especially an actuating drive with a control element that supports the magnet and that can be moved behind a housing wall made of a ferromagnetically conductive material, whereby in front of the wall, there is a magnetic field sensor according to the generic part of claim 1.

STATE OF THE ART

Magnetic sensors serve for contact-free detection or measurement of physical quantities such as position, path, distance, speed or angle of rotation. In many applications, the sensor is controlled by a permanent magnet and then converts the position of this magnet relative to the sensor element into an electrical signal. Examples of such sensors are magnetic field sensors, for example, saturation core probes, GMR (Giant Magneto Resistive sensors), magneto-resistive sensors or Hall elements that are suited for control with permanent magnets as well as for detecting iron parts. Only the magnetic field component that is parallel to the sensor axis is effective in driving the position sensor.

EP 0,457,762 A describes an actuating drive with a control element that can be moved behind a housing wall, whereby a device for generating a magnetic field is attached to said control element and there is a magnetic field sensor in front of the housing wall of the actuating drive. The housing wall is made of a magnetically conductive material, whereby the field lines of the magnetic field in the housing wall form a main flux that is shielded relative to the front of the housing wall. In order to generate a magnetic secondary flux on the front of the housing wall, there is a magnetic conductor having two ends, whose first end is adjacent to the housing wall and whose second end delimits an air gap in which the magnetic field sensor is installed. Likewise, there can also be two magnetic conductors whose second ends are arranged opposite from each other, thus forming an air gap. The actuating drive is configured as a hydraulic high-pressure cylinder with a piston connected to a piston rod as the control element, whereby the cylinder wall forms the housing wall and the device for generating the magnetic field is configured as a permanent magnet. Likewise, in this publication, it was already suggested that it would be conceivable to arrange a Hall probe directly on the outside of the cylinder wall and then to only provide a magnetic conductor whose second end covers the back of the Hall probe, whereby an air gap relative to the cylinder wall is also provided.

TECHNICAL TASK

The invention is based on the objective of improving an actuating drive in such a way that said actuating drive is capable of reliably detecting the position of the control element in a simple manner with simple means, even in the case of a magnetically shielding housing wall.

DISCLOSURE OF THE INVENTION AND ITS ADVANTAGES

According to the invention, the objective is achieved in that a device for detecting a position of the class described above in that, when the magnet is moved relative to said wall, the field lines of the magnetic field build up a main flux which progresses within said wall, whereby said main flux forms a magnetic remanence which is retained after the magnet has passed by and it is directed along the movement axis of the magnet, in accordance with the polarity of the magnet, and builds up a leakage flux towards the front of the wall to the outside thereof, where the magnetic field sensor is positioned, whereby, outside of said housing wall, the leakage flux is directed in the opposite direction from the main flux, and the magnetic field sensor is a magnetic field sensor element that is located at a slight distance from the wall and that detects the field direction of the leakage flux and, when the magnet passes by, the leakage field is superposed by the magnetic field of the magnet, and the magnetic field sensor is capable of registering the change in the polarity of the magnetic field, and a switching signal is derived from the sensor signal in a post-connected electronic evaluation unit.

In an advantageous embodiment of the invention, the magnetic field sensor element is a magneto-resistive sensor and/or a saturation core probe and/or a Hall element and/or a GMR sensor (Giant Magneto Resistive sensor), whereby the magnetic field sensor element is attached directly onto the wall. Likewise, the magnetic field sensor element can be arranged inside a housing which, in turn, is attached, preferably directly, onto the wall or housing wall; the material of the housing is such that it practically does not influence the magnetic field lines that pass through the housing.

The magnetic field sensor element is capable of adequately detecting the weak leakage field emerging from the housing wall. Of course, the magnetic field of a permanent magnet can also be detected with such an arrangement. A saturation core probe consists of a long coil with a core made of highly permeable material such as, for example, amorphous metal; once the core is magnetically saturated, the impedance of the coil diminishes. A magneto-resistive element is a component made of a magnetically conductive material (permalloy strips), whose resistance changes under the influence of an external magnetic field. GMR sensor elements are a further development of the magneto-resistive sensor element.

Preferably, the housing wall is the wall of a cylinder and the control element is a piston connected to a piston rod, whereby the device for generating the magnetic field is arranged on the piston or else on the piston rod, and said device is a permanent magnet that is connected to one or more pole rings which have faces across from the cylinder wall for feeding the magnetic field into the cylinder wall.

The pole ring or pole rings consist of ferromagnetic material, whereby the permanent magnet can be a magnet ring or can be made up of a plurality of magnets, which is or are arranged in a receiving ring made of a non-magnetizable material, whereby the receiving ring is attached to the piston.

An appropriate electronic evaluation unit for processing the sensor signal and for connecting the magnetic field sensor to an SPS or another peripheral device is post-connected to each sensor element.

In order to better evaluate the leakage flux, the magnetic field sensor can be arranged in a recess of the wall or of the housing wall of the actuating drive.

Moreover, the pole ring consists of soft-magnetic steel and has several permanent magnets, for example, in a cylindrical arrangement, in a receiving ring made of non-magnetizable material. The piston and/or the piston rod of the actuating drive can be made of magnetizable or non-magnetizable material such as, for example, brass. The magnetic field sensor can consist of several spatially differently arranged magnetic field sensor elements for purposes of differential evaluation of the magnetic flux density change and for generating a differential signal. On the piston or on the piston rod, there are pole shoes made of soft-magnetic or ferromagnetic material, between which at least one magnet is held. Likewise, the pole shoes are arranged along a circle and a plurality of magnets are arranged between these pole rings in a cross section plane of the cylinder. The magnets can be arranged in a receiving ring made of non-magnetizable material and preferably be equidistant from each other, whereby the receiving ring is arranged between the ferromagnetic pole rings in such a way that the north or south poles of the magnets are directly across from the pole rings or else touch them.

An essential advantage of the invention lies in the fact that, in contrast to the principle established so far, as described in EP 0,457,762 A (Hall element with flux baffles), due to the specific arrangement of the sensor element and the improvement of the electronics, it is possible to totally dispense with the flux baffles, since the magnetic flux directly enters the sensor element, whose output signal is converted into a corresponding switching signal.

The invention is based on the physical principle that the housing wall of the actuating drive or the cylinder wall has to be made of a ferromagnetic material, whereby a magnetic system has to be attached on the actuating drive, whereby said magnetic system has to generate an adequate magnetic field. When the magnet of the magnetic system of the control element moves past the magnetic field sensor, the magnetically excitable elementary magnets are directed and this is retained as remanence within the housing wall, depending on the material of which it is made. In this process, the elementary magnets, which had been non-ordered until then, are rendered into an ordered state, which forms the remanence field. This generates a more or less weak magnetic leakage field, which emerges from the surface of the housing wall, whose field lines run opposite to the direction of the remanence field within the housing wall. The remaining residual magnetism within the wall or housing wall is directed in accordance with the polarity of the magnetic system of the control element.

The magnetic field sensor mounted on the outside of the housing wall scans the magnetic leakage flux along the housing wall. In doing so, the magnetic field sensor either detects only the field of the remanence or else the polarity, that is to say, the field direction of the remanence.

If the control element approaches the magnetic field sensor, then the strong field of the magnet system generates a leakage field on the outer wall of the housing wall that is superposed over the field of the remanence field; the magnetic field sensor registers this change in the magnetic field.

Figure 2:
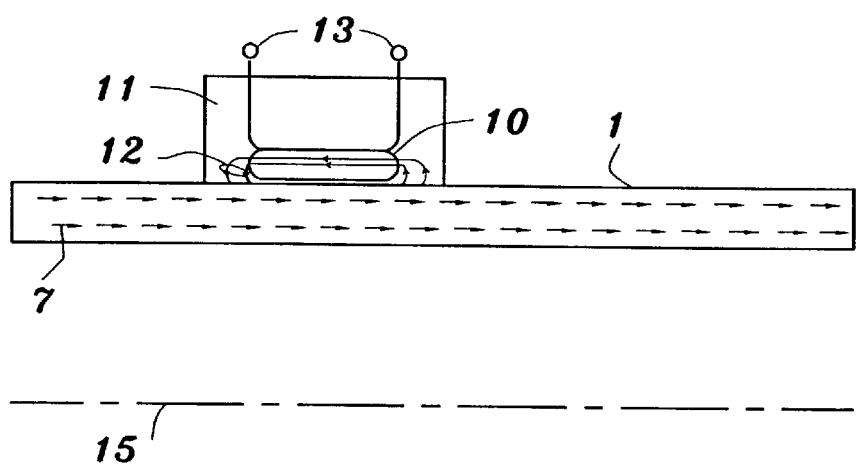
Figure 3:
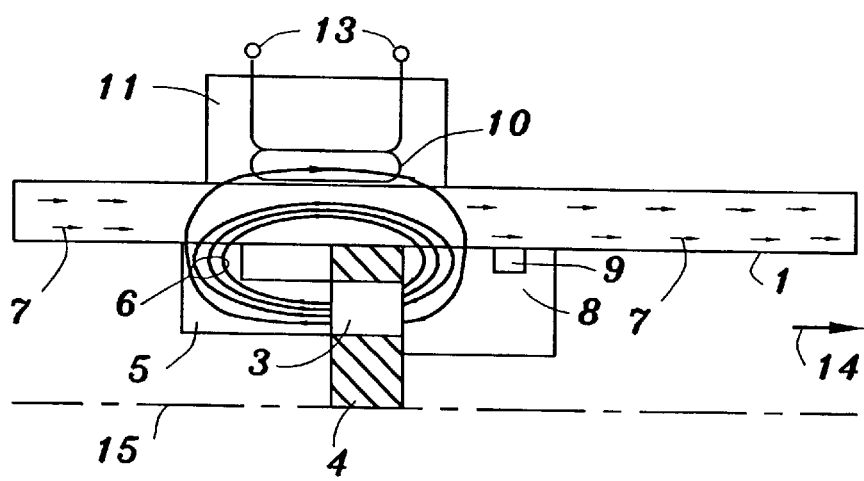
Figure 4:
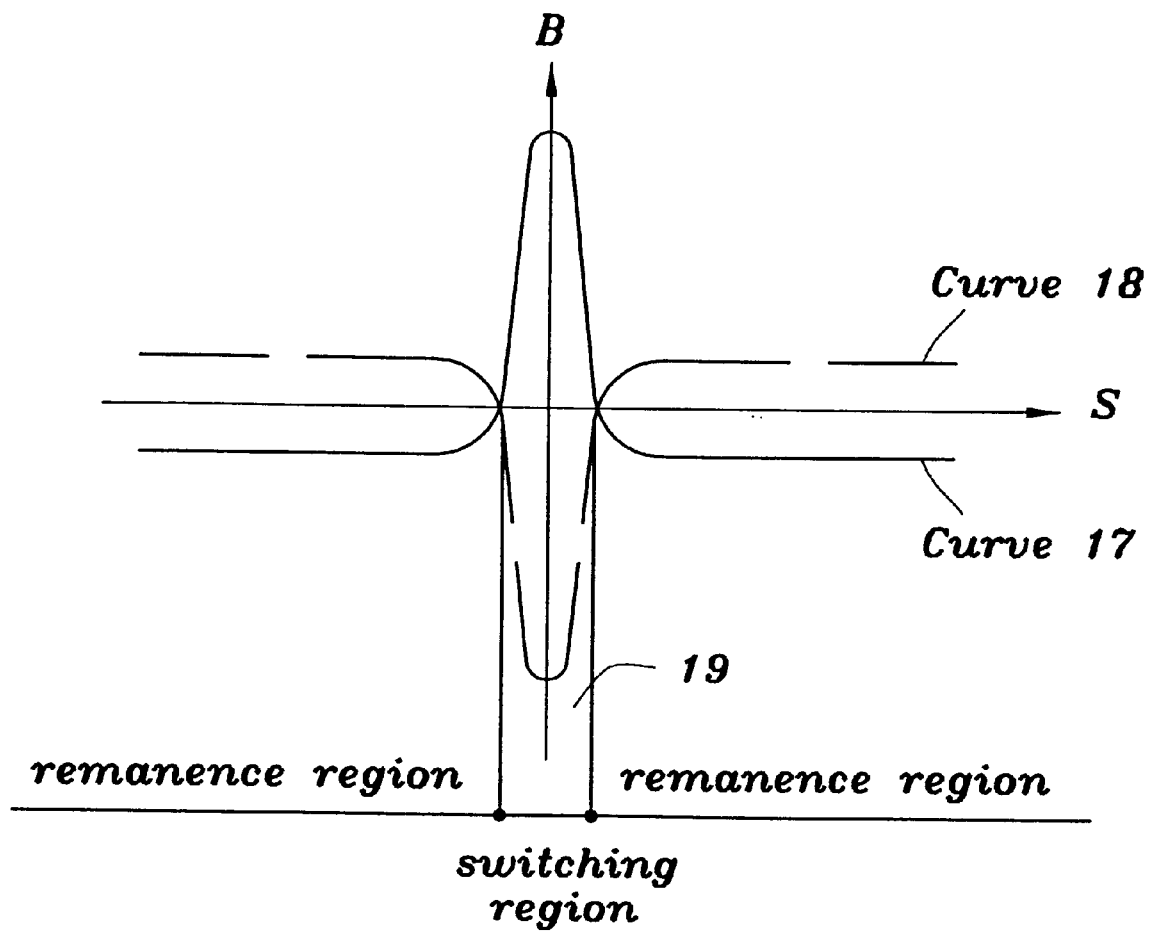
Figure 5:
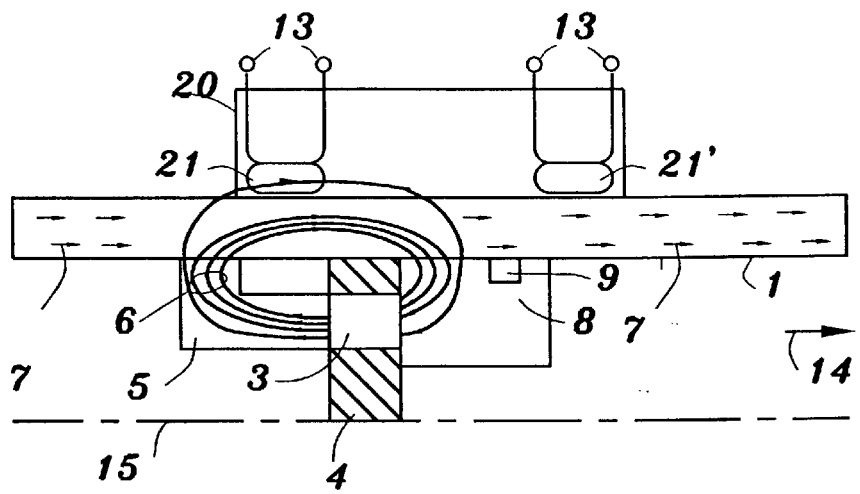
Figure 6:
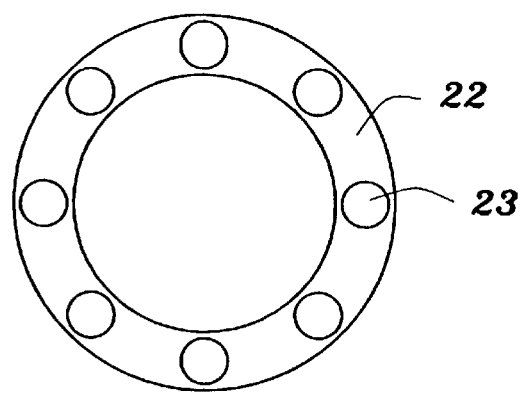
Figure 7:
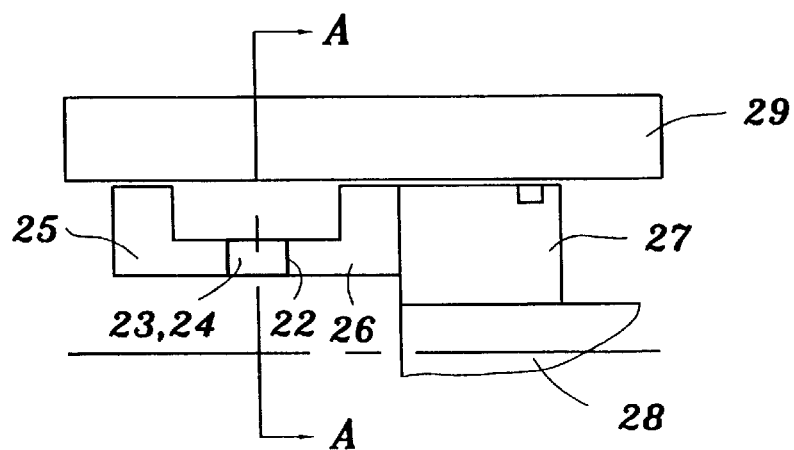

A brief description of the drawing in which the following is shown:

FIG. 1 a section from a cylinder wall with a piston rod and piston that has a permanent magnet for generating the magnetic field, FIG. 2 a schematic representation of the remanence field within the cylinder wall together with the resultant leakage field as well as a magnetic field sensor that is mounted directly on the cylinder wall, FIG. 3 the magnetic field that forms inside the cylinder wall and changes when the permanent magnet of the control element passes over it once again, FIG. 4 a schematic representation of the course of the magnetic flux density on the cylinder wall, FIG. 5 a plurality of magnetic field sensors which are arranged separately from each other for purposes of differential measurement, FIG. 6 a top view of a receiving ring with a plurality of magnets arranged at equidistant intervals and FIG. 7 a section of a cylinder wall with a piston made of non-magnetizable material as well as a push rod, whereby there are pole rings arranged on the piston, and there is at least one magnet held between these pole rings.

WAYS TO IMPLEMENT THE INVENTION

According to FIG. 1, a housing wall 1, which can be a cylinder wall of a piston-cylinder system, is made of a ferromagnetic material having a certain degree of magnetic hardness. A control element 2, such as a piston 8 with a piston rod 16, both of which are made of ferromagnetic material, slides along the cylinder wall 1, whereby a gasket 9 is arranged peripherally inside the piston, and said gasket, in turn, is made of non-magnetic material. The piston 8 has a holder 4, such as a receiving ring, made of non-magnetizable material, within which a permanent magnet 3 in the form of a ring magnet or else of an individual magnet or several individual magnets is arranged. A ferromagnetic pole ring 5 extends from the permanent magnet 3 to the cylinder wall 1, whereby faces of the pole ring 5 are directly across from the cylinder wall 1 in order to introduce the magnetic field 6 into said wall.

Moreover, FIG. 1 shows two differently formatted areas of the cylinder wall 1. At the place where the piston 8 with the permanent magnet 3 slides past, the elementary magnets 7 direct themselves in a directed manner, which is indicated by the reference numeral 7. In the other areas of the cylinder wall 1, the elementary magnets 7' are still unformatted, which is indicated by the arrows 7' running randomly in all directions. The entire arrangement is preferably rotation-symmetrical with respect to the center axis 15, whereby the control element 2 moves in the direction of the arrow 14.

For the proper functioning of the device, the control element has to pass once through the entire stroke of the actuating drive, as a result of which the entire housing wall is magnetically formatted. In this process, the elementary magnets that had been disordered until then are all rendered into an ordered state; a remanence field is obtained. The remaining residual magnetism is directed along the polarity of the magnet system of the control element.

FIG. 2 shows that a magnetic field sensor 10, which is situated in a housing 11, is placed directly from the outside onto the cylinder wall 1 This magnetic field sensor element 10 is capable of directly detecting the leakage field 12 that forms as a result of the remanence and that emerges from the surface of the cylinder wall 1. The leakage field 12 is directed in the opposite direction from the remanence field 7 within the cylinder, as shown in FIG. 2. The magnetic field sensor 10 has electrical connections 13 for picking up the generated electrical sensor signal.

FIG. 3 shows the change in the magnetic field when the housing wall 1 is once again passed by the control element 2 along with the permanent magnet 3. The leakage field 12 that has formed within the cylinder wall 1 according to FIG. 2 is passed by the magnetic field 6 of the permanent magnet 3, so that, during the period of time of the passing, the leakage field 12 is superposed by the magnetic field 6 of the permanent magnet 3. The magnetic field sensor 11 is capable of determining the change in the magnetic field and of generating a sensor signal.

By way of an example, FIG. 4 is an illustrative representation showing the course of the magnetic flux density on the housing or cylinder wall along the lengthwise axis. Depending on the polarity of the permanent magnet 3, two different flux density curves 17, 18 are obtained. Within the narrow switching range 19, a switching operation takes place in which the polarity of the magnetic field within the magnetic field sensor 10 is briefly reversed, whereby the magnetic field sensor 10 registers the change in polarity of the field. The two areas on the right and left indicate the flux density in the remanence case. If the piston 2 with the permanent magnet 3 is located directly below the magnetic field sensor 10, then the change in the magnetic flux density generates an output signal of the magnetic field sensor 10 and thus switches through the electronic system. In this manner, the information about the control element or about the piston position is obtained outside of the housing wall or of the cylinder.

FIG. 5 shows an example of a device corresponding to FIG. 3, whereby here the magnetic field sensor 20 consists of two magnetic field sensor elements 21, 21' located spatially apart from each other for purposes of differential evaluation of the magnetic flux density change and for generating a differential signal.

FIG. 6 shows a top view of a receiving ring 22 made of non-magnetizable material with a plurality of magnets 23 that are arranged at equidistant intervals from each other. FIG. 7 shows a section of a cylinder wall 29 with a piston 27 made of a non-magnetizable material as well as with a push rod 28, whereby, on the piston 27, there are pole shoes in the form of pole rings 25, 26 made of ferromagnetic material, between which at least one magnet 24 is held. FIG. 6 can also show a cross section in the direction of the line A—A by FIG. 7, whereby then FIG. 7 should be visualized as rotation-symmetrical and the pole rings 25, 26 are likewise arranged in a circle, and the receiving ring 22 of FIG. 7 is located between the pole rings 25, 26 in a cross section plane of the cylinder, whereby said receiving ring has a plurality of magnets 23, 24, preferably at equidistant intervals from each other. The receiving ring 22 is arranged between the ferromagnetic pole shoes 25, 26 in such a way that the north and south poles of the magnets 23, 24 are directly across from the pole shoes or else touch them so that the magnets 23, 24 feed the magnetic field directly into the pole shoes 25, 26.

Commercial Applicability

The subject matter of the invention is commercially applicable especially for cases where the position of a piston in steel cylinders of a piston-cylinder system has to be monitored such as, for example, with actuating drives in hydraulic technology. The subject matter of the invention replaces, for instance, Hall elements with flux baffles, whereby an essential advantage lies in the fact that, due to the specific arrangement of the sensor element as well as the improvement of the electronics, it is possible to totally dispense with the flux baffles, since the magnetic flux directly enters the sensor element whose output signal is converted into a corresponding switching signal.

LIST OF REFERENCE NUMERALS 1, 29 housing or cylinder wall
2 control element
3, 23, 24 magnets or permanent magnets
4 holder
5, 25, 26 pole rings
6 magnetic field lines
7, 7' elementary magnets
8, 27 piston
9 gasket
10, 11 magnetic field sensor
12 leakage field
13 electrical connections
14 arrow direction
15 center axis
16 piston rod
17, 18 flux density curves
19 switching range
20 magnetic field sensor
21, 21' magnetic field sensor elements
22 receiving ring
28 push rod

What is claimed is:

1. A device for detecting the position of a moveably arranged control element of an actuating drive behind a housing wall made of a ferromagnetic material comprising
   a housing wall made of a ferromagnetic material;
   a relatively moveable control element having a magnet disposed behind the housing wall, wherein the control element having the magnet is moved relative to the housing wall;
   an actuating drive supporting the moveable control element and the magnet for generating a magnetic field through the housing wall, wherein field lines of the magnetic field build up a main flux which progresses within said housing wall, whereby said main flux forms a magnetic remanence which is retained after the magnet has passed by and wherein the field of the magnetic remanence is directed along the movement axis of the magnet in accordance with the polarity, and builds up a leakage flux towards the front of the housing wall to the outside of the housing wall;
   a magnetic field sensor comprising a magnetic field sensor element located outside of said housing wall, wherein a leakage flux is directed in an opposite direction relative to the field direction of the main flux, and wherein the magnetic field sensor element detects the field direction of the leakage flux and, wherein the leakage field is superposed by the magnetic field of the magnet when the control element with the magnet passes by, and wherein the magnetic field sensor element is capable of registering the change in the polarity of the magnetic field;
   an evaluation electronic unit post-connected to the magnetic field sensor element for deriving a switching signal from the signal of the magnetic field sensor element in the electronic evaluation unit.

2. The device according to claim 1 wherein the magnetic field sensor element is a member selected from the group consisting of a magnetoresistive sensor, a saturation core probe, a GMR sensor, and a field plate, wherein the magnetic field sensor element is attached directly onto the housing wall.

3. The device according to claim 2 wherein the magnetic field sensor is arranged in front of the housing wall of the actuating drive.

4. The device according to claim 2 wherein the housing wall is a cylinder wall of a cylinder and wherein the control element is a piston connected to a piston rod and wherein the control element is made of ferromagnetic material, wherein a magnet is on the piston or else on the piston rod, wherein the magnet is a permanent magnet connected to a pole ring made of ferromagnetic material which has faces across from the cylinder wall for feeding the magnetic field into the cylinder wall.

5. The device according to claim 4 wherein a member selected from the group consisting of piston and piston rod of the actuating drive is made of non-magnetizable material.

6. The device according to claim 5 wherein pole shoes made of soft-magnetic or ferromagnetic material, are disposed on a member selected from the group consisting of piston and piston rod, wherein at least one magnet (24) is held between the pole shoes.

7. The device according to claim 6 wherein the pole shoes are arranged along a circle and wherein a plurality of magnets are arranged between these pole rings in a cross section plane of the cylinder.

8. The device according to claim 7 wherein the magnets are arranged in a receiving ring made of a non-magnetizable material and are preferably equidistant from each other, wherein the receiving ring is arranged between the ferromagnetic pole rings in such a way that the north or south poles of the magnets are directly across from the pole rings or else touch the pole rings.

9. The device according to claim 4 wherein a member selected from the group consisting of piston and piston rod of the actuating drive is made of magnetizable material.

10. The device according to claim 4 wherein the pole ring is made of a ferromagnetic material and wherein the permanent magnet is a magnet ring which is arranged in a receiving ring made of a non-magnetizable material, wherein the receiving ring is attached to the piston.

11. The device according to claim 4 wherein the pole ring consists of soft-magnetic steel and has several permanent magnets in a cylindrical arrangement in a receiving ring made of non-magnetizable material.

12. The device according to claim 2 wherein the magnetic field sensor is arranged in a recess of the housing wall of the actuating drive.

13. The device according to claim 2 wherein the magnetic field sensor consists of several spatially differently arranged magnetic field sensor elements for purposes of differential evaluation of the magnetic flux density change and for generating a differential signal.

14. The device according to claim 1 further comprising
a case, wherein the magnetic field sensor element is arranged inside the case, which case is attached onto the housing wall.

15. The device according to claim 1, characterized in that the housing wall (1, 29) is the cylinder wall of a cylinder and the control element (2) is a piston (8, 27) connected to a piston rod (16, 28) and is made of ferromagnetic material, whereby, on the piston or else on the piston rod, there is a magnet (3, 23, 24) that is a permanent magnet that is connected to a pole ring (5, 25, 26) made of ferromagnetic material which has faces across from the cylinder wall (1) for feeding the magnetic field into the cylinder wall (1, 29).

16. The device according to claim 1, characterized in that the pole ring (5) is made of ferromagnetic material and the permanent magnet (3) is a magnet ring which is arranged in a receiving ring (4) made of a non-magnetizable material, whereby the receiving ring is attached to the piston,
in that the magnetic field sensor (10, 21, 21') is arranged in a recess of the housing wall (1, 29) of the actuating drive,
in that the pole ring consists of soft-magnetic steel and has several permanent magnets (23), for example, in a cylindrical arrangement, in a receiving ring (22) made of non-magnetizable material.

17. The device according to claim 15, characterized in that the piston (27) and/or the piston rod (28) of the actuating drive is made of magnetizable or non-magnetizable material such as, for example, brass.

18. A process or detecting the position of a moveably arranged control element comprising
moving a control element of an actuating drive behind a housing wall made of a ferromagnetic material, together with a magnet relative to the housing wall;
generating magnetic field through the housing wall with a magnet forming part of the control element;
thereby building up a main flux for magnetic field lines of a magnetic field, wherein the main flux progresses within said housing wall, with a magnetic remanence;
building up a leakage flux towards a front of the housing wall with the magnetic remanence;
thereby directing the leakage flux in an opposite direction from a direction of the main flux at a location outside of said housing wall;
positioning a magnetic field sensor outside of the housing wall;
detecting the field direction of the leakage flux with the magnetic field sensor;
passing the control element with the magnet by the main flux;
superposing the leakage field by the magnetic field of the magnet;
registering the change in the polarity of the magnetic field with the magnetic field sensor element; deriving a switching signal from the signal of the magnetic field sensor in a post-connected electronic evaluation unit.

19. A device or the execution of the process according to claim 18, characterized by the following features:
behind a housing wall (1, 29) made of a ferromagnetic material, there is a relatively moveable control element (2, 27) of an actuating drive that has a magnet (3, 23, 24) for generating a magnetic field through the housing wall (1, 29), whereby
a magnetic field sensor, which is a magnetic field sensor element (10, 21, 21'), is located outside of the housing wall (1, 29),
an evaluation electronic unit is post-connected to the magnetic field sensor element (10, 21, 21'),
when the device is used and the control element (2, 27) with the magnet (3, 23, 24) is moved relative to the housing wall (1, 29), the field lines (6) of the magnetic field build up a main flux which progresses within said wall (1, 29), whereby said main flux forms a magnetic remanence (7) which is retained after the magnet (3, 23, 24) has passed by and it is directed along the movement axis of the magnet (3, 23, 24) in accordance with the polarity, and builds up a leakage flux towards the front of the housing wall (1, 29) to the outside thereof, where the magnetic field sensor element (10, 21, 21') is positioned, whereby, outside of said housing wall (1, 29), the leakage flux (12) is directed in the opposite direction from the main flux, and the magnetic field sensor element detects the field direction of the leakage flux and, when the control element with the magnet (3, 23, 24) passes by, the leakage field is superposed by the magnetic field of the magnet (3, 23, 24), and the magnetic field sensor element (10, 21, 21') is capable of registering the change in the polarity of the magnetic field, and a switching signal can be derived from the signal of the magnetic field sensor element (10, 21, 21') in the electronic evaluation unit.

20. The device according to claim 19, characterized in that the magnetic field sensor element (10, 21, 21') is, for example, a magnetoresistive sensor and/or a saturation core probe and/or a GMR sensor and/or a field plate, wherein the magnetic field sensor element (10, 21, 21') is attached directly onto the housing wall (1, 29).

21. The device according to claim 19, characterized in that the magnetic field sensor (20) consists of several spatially differently arranged magnetic field sensor elements (21, 21') for purposes of differential evaluation of the magnetic flux density change and for generating a differential signal, in that on the piston (27) or on the piston rod, there are pole shoes (25, 26) made of soft-magnetic or ferromagnetic material, between which at least one magnet (24) is held.

22. The device according to claim 21, characterized in that the pole shoes (25, 26) are arranged along a circle and a plurality of magnets (23, 24) are arranged between these pole rings (25, 26) in a cross section plane of the cylinder (29), in that the magnets (23, 24) are arranged in a receiving ring (22) made of non magnetizable material and are preferably equidistant from each other, whereby the receiving ring (22) is arranged between the ferromagnetic pole rings (25, 26) in such a way that the north or south poles of the magnets (23, 24) are directly across from the pole rings (25, 26) or else touch them, in that the magnetic field sensor element (10, 20, 21') is arranged inside a case, which case is attached onto the housing wall (1, 29).

23. A process for detecting the position of a moveably arranged control element (2, 27) of an actuating drive behind a housing wall (1, 29) made of a ferromagnetic material, whereby the control element (2, 27) has a magnet (3, 23, 24) for generating magnetic field through the housing wall (1, 29) and a magnetic field sensor (10, 21, 21') is positioned outside of the housing wall (1, 29), characterized in that the control element (2, 27), together with the magnet (3, 23, 24), is moved relative to the housing wall (1, 29), as a result of which the field lines (6) of the magnetic field build up a main flux (6), which progresses within said housing wall (1, 29), with magnetic remanence, which builds up a leakage flux towards the front of the housing wall (1, 29), whereby, outside of said housing wall (1, 29), the leakage flux is directed in the opposite direction from the main flux, and the magnetic field sensor detects the field direction of the leakage flux (12) and, when the control element (2, 27) with the magnet (3, 23, 24) passes by, the leakage field is superposed by the magnetic field (6) of the magnet (3, 23, 24), and the magnetic field sensor element (10, 21, 21') registers the change in the polarity of the magnetic field, and a switching signal is derived from the signal of the magnetic field sensor (10, 21, 21') in a post-connected electronic evaluation unit.

* * * * *